May 31, 1949.  R. D. MOORE  2,471,578
FAN
Filed Jan. 5, 1946
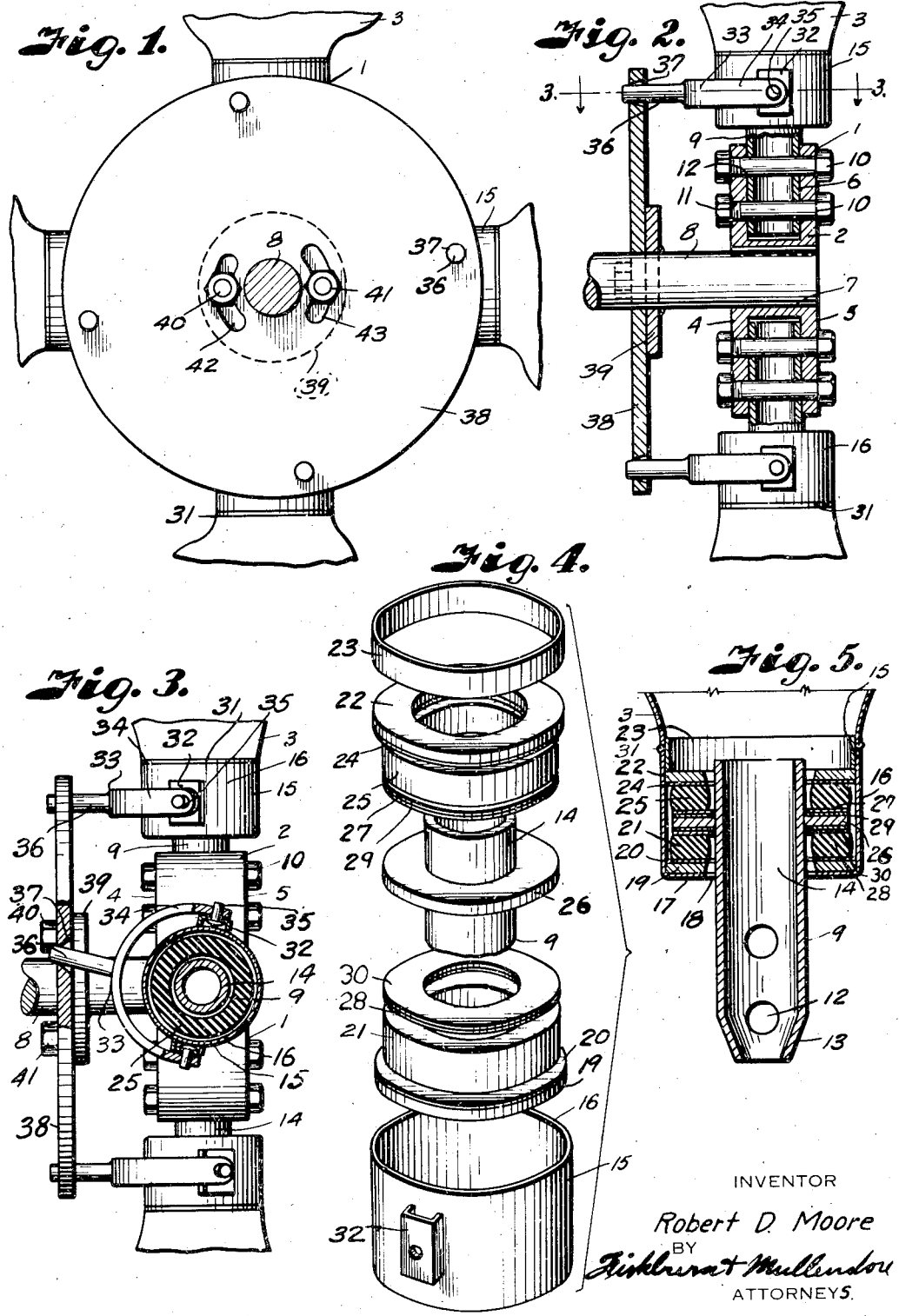
INVENTOR
Robert D. Moore
BY
Finkburat Mullendou
ATTORNEYS.

Patented May 31, 1949

2,471,578

UNITED STATES PATENT OFFICE 2,471,578

FAN

Robert D. Moore, Kansas City, Mo., assignor to The Moore Company, Kansas City, Mo., a corporation of Missouri Application January 5, 1946, Serial No. 639,265

4 Claims. (Cl. 170—160.52)

This invention relates to fans and particularly those of large size wherein high internal stresses are set up in the connections of the fan blades with the hubs when such fans are being operated. These stresses are produced by lift and drag of the fan blades countered by centrifugal force with the result that the relative position of the blades change with relative changes in forces acting on the blades. This change produces a constant bending or flexing with ultimate failure in the connections.

It is, therefore, a principal object of the present invention to provide a flexible or universal connection between the hub and blades of a fan which allows sufficient relative movement so that the blades are free to change their running positions without producing destructional stresses.

Other objects of the invention are to provide a fan connection wherewith the blades are adapted to be turned for adjustment of the pitch angle of the blades; and to provide a fan that is of simple and safe construction and capable of ready assembly.

In accomplishing these and other objects of the invention, I have provided improved structure, the preferred form of which is illustrated in the accompanying drawing wherein:

Fig. 1 is an elevational view of the hub and adjacent base portions of the blades of a fan embodying the features of the present invention.

Fig. 2 is a central section through the hub showing the base of the blades in elevation.

Fig. 3 is a section on the line 3—3 of Fig. 2.

Fig. 4 is a perspective view of the parts composing one of the connections between a blade and hub of the fan, the parts being shown in spaced relation and the thrust washers prior to vulcanizing thereof to the resilient rings.

Fig. 5 is a section of the parts when assembled.

Referring more in detail to the drawings:

1 designates a fan constructed in accordance with the present invention and which includes a hub 2 and radially arranged blades 3. The hub illustrated comprises a substantially cylindrical member having substantially flat end faces 4 and 5 and is of a size to accommodate a plurality of radially arranged sockets 6 (Fig. 2) opening inwardly from the periphery thereof and an axial opening 7 for a shaft 8 on which the fan may be mounted. Inserted within the sockets are preferably tubular spindles 9 that are securely anchored by fastening devices such as bolts 10 passing through registering openings 11 and 12 in the hub and spindle respectively as best shown in Fig. 2. If necessary, the lower ends of the spindles may be wedge shape as at 13 (Fig. 5). The spindles have portions 14 projecting from the periphery of the hub to mount the blades 3 by means of connections which allow for limited universal movement of the fan blades so that they are self-adjusting responsive to changes in the resultant of the lift, drag, and centrifugal forces which act thereon. The connections for the blades 3 include cup-like housings 15 welded thereto and having a cylindrical wall 16 and a bottom 17. The bottoms 17 have central openings 18 (Figs. 5) of somewhat larger diameter than the spindles 9 to pass the ends 14 of the spindles therethrough.

Supported within the cup-like housing on the bottoms 17 and in encircling relation with the openings 18 are washers 19 which seat thrust washers 20 that are vulcanized or otherwise attached to rings 21. The rings 21 are formed of resilient material and having an inner diameter to freely accommodate the spindles and of an outer diameter to be freely inserted in the cup-like housing. The cup-like housings also carry washers 22 that are retained in fixed position by bands 23 inset into the open ends of the cup-like housings and which seat thrust washers 24 complementary to the washers 20. The washers 24 are attached to the rings 25 similar to the rings 21 and which cooperates therewith for exerting thrust on disk-like flanges or collars 26 that are fixed to the spindles by welding or the like. Preferably inserted between the collars 26 and thrust washers 27—28 that are attached to the resilient rings 21 and 25 are washers 29 and 30.

In assembling the parts, the disk-like collars 26 are secured in proper position on the spindles by solder or welds. The thrust washers 19 and resilient rings 21 are then dropped into the cups followed by the washers 30. The anchorage ends of the spindles are then inserted through the washers so that the collars 26 thereon seat on the washers 30. The washers 29 are then applied over the spindles followed by the resilient rings 25, and the washers 22. Pressure is then applied against the ends 17 of the cup-like housings and thrust washers 22 to compress the resilient members and establish the desired frictional contacts between the wear washers and collars 26. The bands 23 are then inserted in the open ends of the cups and suitably welded to retain the resilient rings in compression. The blades are then secured to the open ends of the cups by soldering or welding 31 to complete the assembly.

In mounting the blades on the hub, the anchorage ends of the spindles 9 are inserted in their sockets 6 and secured by the fastening device 10. With the structure thus far described, it is obvious that during starting and stopping of the fan the blades are free to move on the spindles due to resiliency of the rings 21 and 25 so that blades may position themselves under the forces acting thereon without bending of the connections or placing destructive stresses therein. Thus far described, the blades are free to turn on the spindles and I provide means for supporting the blades at a desired pitch angle. The cup-like housings have ears 32 welded to opposite diametrical sides thereof for connecting yokes 33 having arms 34 straddling the cup-like housings and secured to the ears 32 by trunnions 35. The yokes extend laterally from the cup-like housings of the blades and have stems 36 engaged within openings 37 of a connecting member 38 sleeved on the shaft 8. The member 38 forms a connection between all of the yokes whereby the blades are connected for simultaneous adjustment incidental to partial rotation of the member 38 in a direction to give the desired pitch. In order to retain the adjustment and anchor the member 38, the shaft 8 is provided with a stop collar 39 against which one face of the member 38 is clamped by fastening devices such as cap screws 40 and 41. The fastening devices pass through suitable openings in the stop collar and through arcuate slots 42 and 43 in the member 38 as shown in Fig. 1. After the blades have been assembled on the hub, the member 38 is applied to the shaft to engage the stop collar 39 with the stems 36 passing through the openings 37 in the member 38.

Attention is here directed to the fact that the openings 37 are shaped so that they provide the desired relative angular movement between the stems and the connecting member 38 when it is rotated to adjust the blades. The fastening devices 40 and 41 may then be applied and the member 38 turned to move the yokes and shift the blades to the desired angle, after which the fastening devices are tightened to retain the fan blades at the angle selected.

From the foregoing it is obvious that I have provided a fan construction whereby the blades are resiliently mounted for universal movement on the hub of the fan without producing tension in the resilient members or destructive stresses in the connections when the fan is in operation.

What I claim and desire to secure by Letters Patent is:

1. A fan including a hub having radial spindles, blades, cup-like housings carried by the blades and having openings for passing the spindles, collars on the spindles, resilient members in said housing on the respective sides of the collars, and means in the cup-like housings for retaining said resilient members in compression in the axial direction of the spindles.

2. The combination with a fan blade and its hub, of means for connecting the blade with the hub including a radial spindle carried by the hub, a cup-like housing sleeved over the spindle, said cup-like housing being fixed to the fan blade and having an apertured end, a washer seated in the cup-like housing, compressible ring members in the housing and sleeved on the spindle, a collar on the spindle and engaged between the compressible ring members, an outer washer cooperating with the first-named washer and collar to compress said members in the axial direction of the spindle, and means fixed to the cup-like housing for retaining the last-named washer.

3. A fan including a hub member, a blade member, a spindle on one of said members, a housing on the other member loosely encircling the spindle and forming an annular enclosure spaced from the spindle, a collar fixed to the spindle and projecting into said space but terminating short of the housing, resilient rings encircling the spindle, each of said resilient rings having a bearing face engaging an opposite face of the collar, washers encircling the spindle in spaced relation therewith and having movement in the housing to maintain engagement with opposite faces of the resilient rings, and means carried by the housing for applying pressure to the movable washers for compressing the resilient rings to retain said rings in clamping engagement with the fixed collar.

4. A fan including a hub member, a blade member, a spindle on one of said members, a housing on the other member loosely encircling the spindle and forming an annular enclosure spaced from the spindle, a collar fixed to the spindle and projecting into said space but terminating short of the housing, resilient rings encircling the spindle, each of said resilient rings having a bearing face engaging an opposite face of the collar, washers encircling the spindle in spaced relation therewith and having movement in the housing to maintain engagement with opposite faces of the resilient rings, means carried by the housing for applying pressure to the movable washers for compressing the resilient rings to retain said rings in clamping engagement with the fixed collar, and means connected with said blade for retaining the blade from axial rotation on the axis of the spindle.

ROBERT D. MOORE.

REFERENCES CITED

The following references are of record in the file of this patent:

UNITED STATES PATENTS

| Number | Name | Date |
|---|---|---|
| 1,829,443 | Goberlau et al. | Oct. 27, 1931 |
| 1,921,931 | Levasseur | Aug. 8, 1933 |
| 1,930,548 | Barbarou | Oct. 17, 1933 |
| 1,935,314 | Finch et al. | Nov. 14, 1933 |
| 1,995,460 | Pecker | Mar. 26, 1935 |
| 2,241,055 | Chilton | May 6, 1941 |
| 2,245,251 | Chilton | June 10, 1941 |

FOREIGN PATENTS

| Number | Country | Date |
|---|---|---|
| 337,552 | Italy | Mar. 7, 1936 |